(12) United States Patent  
Takada

(10) Patent No.: US 9,160,230 B2  
(45) Date of Patent: Oct. 13, 2015

(54) DC/DC CONVERTER AND ELECTRONIC APPARATUS

(71) Applicant: Seiko Instruments Inc., Chiba-shi, Chiba (JP)

(72) Inventor: Kosuke Takada, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 14/619,760

(22) Filed: Feb. 11, 2015

(65) Prior Publication Data

US 2015/0229210 A1 Aug. 13, 2015

(30) Foreign Application Priority Data

Feb. 13, 2014 (JP) ................. 2014-025806

(51) Int. Cl.
*G05F 1/00* (2006.01)
*H02M 3/156* (2006.01)

(52) U.S. Cl.
CPC ..................... *H02M 3/156* (2013.01)

(58) Field of Classification Search
CPC ..... H02M 3/156; H02M 3/1588; H02M 1/36; H02M 2001/0032; H02M 2001/0025; H02M 1/32; Y02B 70/1466; Y02B 70/16; Y02B 7/0068; Y02B 7/022; Y02B 7/045

USPC ................. 323/223–224, 265, 268, 271–272, 323/282–285, 288; 320/139–143, 145, 320/151–152, 157–159, 161–165

See application file for complete search history.

(56) References Cited

U.S. PATENT DOCUMENTS

| | | | | |
|---|---|---|---|---|
| 7,605,573 | B2 * | 10/2009 | Nishida | 323/282 |
| 7,928,715 | B2 * | 4/2011 | Shibata | 323/288 |
| 7,965,070 | B2 * | 6/2011 | Nakahashi | 323/285 |
| 2008/0290851 | A1 * | 11/2008 | Akashi et al. | 323/283 |
| 2010/0283442 | A1 * | 11/2010 | Nakashima | 323/283 |
| 2012/0049829 | A1 * | 3/2012 | Murakami | 323/288 |
| 2012/0313601 | A1 * | 12/2012 | Deguchi et al. | 323/282 |

FOREIGN PATENT DOCUMENTS

JP 2010-81747 A 4/2010

* cited by examiner

*Primary Examiner* — Adolf Berhane  
*Assistant Examiner* — Henry Lee, III  
(74) *Attorney, Agent, or Firm* — Brinks Gilson & Lione

(57) ABSTRACT

To provide a DC/DC converter equipped with a clamp circuit having low power consumption, and reducible in chip area. A clamp circuit which clamps an output terminal of an error amplifier circuit equipped with an amplifier and a first transistor connected to an output terminal of the amplifier is configured to include a second transistor having a source connected to a source of the first transistor, a gate connected to a constant voltage circuit, and a drain connected to a constant current circuit, and a third transistor having a gate connected to the drain of the second transistor and a drain connected to the output of the amplifier.

4 Claims, 3 Drawing Sheets

DC/DC CONVERTER AND ELECTRONIC APPARATUS

RELATED APPLICATIONS

This application claims priority under 35 U.S.C. §119 to Japanese Patent Application No. 2014-025806 filed on Feb. 13, 2014, the entire content of which is hereby incorporated by reference.

BACKGROUND OF THE INVENTION

1. Field of the Invention

The present invention relates to a DC/DC converter which supplies an operating voltage of an electronic apparatus, and more specifically to a DC/DC converter low in power consumption, which clamps the output of an error amplifier circuit of the DC/DC converter.

2. Background Art

A related art DC/DC converter will be described. FIG. 3 is a circuit diagram illustrating the related art DC/DC converter.

The related art DC/DC converter is equipped with an error amplifier circuit 107, a comparator 109, an oscillation circuit 110, an amplifier 108, a flip-flop circuit 111, a clamp circuit 300, a reference voltage circuit 106, a coil 115, a capacitor 116, a PMOS transistor 112, an NMOS transistor 113, resistors 104, 105 and 114, a ground terminal 100, an output terminal 102, and a power supply terminal 101. The clamp circuit 300 is equipped with a constant current circuit 302, a constant voltage circuit 301, PMOS transistors 303 and 305, NMOS transistors 304 and 306, and a PNP bipolar transistor 307.

The constant voltage circuit 301 outputs a voltage VE1. When an output voltage of the error amplifier circuit 107 exceeds the voltage VE1, a current is drawn through the PNP bipolar transistor 307, so that the output voltage of the error amplifier circuit 107 is clamped up to the voltage VE1 regardless of the output operation of the error amplifier circuit 107. Incidentally, when the output voltage of the error amplifier circuit 107 falls below the voltage VE1 due to the output operation thereof, the current drawing operation of the PNP bipolar transistor 307 is stopped and a voltage value obtained by the output operation of the error amplifier circuit 107 is outputted as it is (refer to, for example, FIG. 1 in Patent Document 1).

Patent Document 1

Japanese Patent Application Laid-Open No. 2010-81747

SUMMARY OF THE INVENTION

The related art DC/DC converter is however accompanied by a problem that current consumption of the clamp circuit 300 is large and a chip area thereof becomes large.

The present invention has been made in view of the above problem and provides a DC/DC converter and an electronic apparatus, which are capable of achieving low power consumption of a clamp circuit and reducible in chip area.

In order to solve the related art problems, one aspect of the present invention provides a DC/DC converter configured as follows:

The DC/DC converter is equipped with an error amplifier circuit comprised of an amplifier which amplifies and outputs a difference between a divided voltage obtained by dividing a voltage outputted from an output transistor and a reference voltage, and a first transistor having a gate inputted with the output of the amplifier; a clamp circuit which clamps an output voltage of the error amplifier circuit; a ramp wave generating circuit which generates a ramp wave; and a PWM comparator which compares the output voltage of the error amplifier circuit and the ramp wave. The clamp circuit is equipped with a constant voltage circuit, a constant current circuit, a second transistor having a source connected to a source of the first transistor, a gate connected to the constant voltage circuit, and a drain connected to the constant current circuit, and a third transistor having a gate connected to the drain of the second transistor and a drain connected to an output of the amplifier.

There is provided an electronic apparatus equipped with the above DC/DC converter.

A DC/C converter of the present invention is capable of reducing current consumption of a clamp circuit and reducible in chip area.

Further, there is also an effect that it is possible to easily set a voltage adapted to start the clamping of the clamp circuit.

DETAILED DESCRIPTION OF THE PREFERRED EMBODIMENTS

Preferred embodiments of the present invention will hereinafter be described with reference to the accompanying drawings.

First Embodiment

Figure 1:
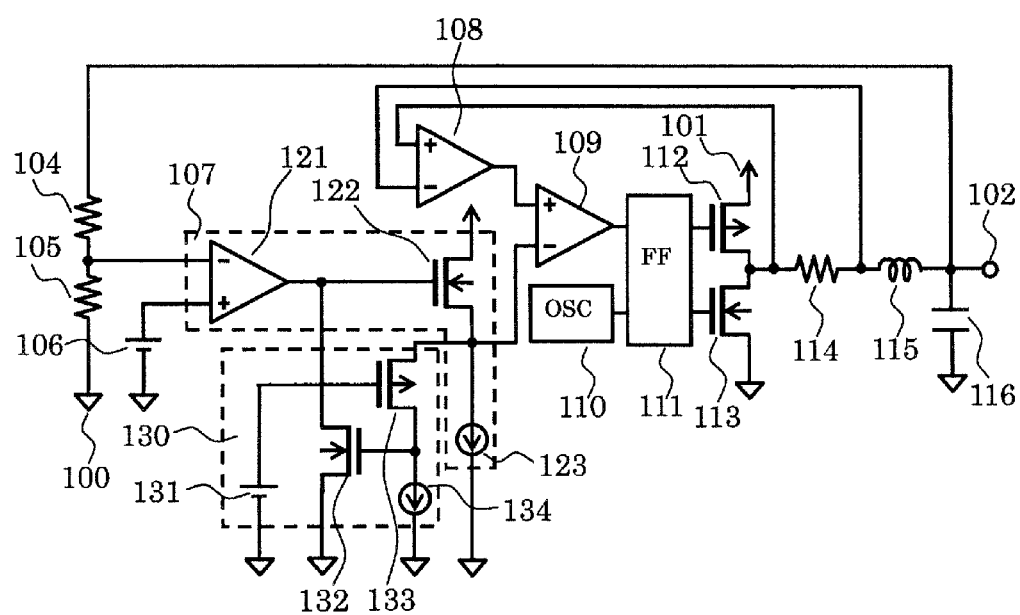
FIG. 1 is a circuit diagram illustrating a configuration of a DC/DC converter according to a first embodiment.

FIG. 1 is a circuit diagram of a DC/DC converter according to a first embodiment.

The DC/DC converter according to the first embodiment is equipped with an error amplifier circuit 107, a PWM comparator 109, an oscillation circuit 110, an amplifier 108, a flip-flop circuit 111, a clamp circuit 130, a reference voltage circuit 106, a coil 115, a capacitor 116, a PMOS transistor 112, an NMOS transistor 113, resistors 104, 105 and 114, a ground terminal 100, an output terminal 102, and a power supply terminal 101. The clamp circuit 130 is equipped with a constant current circuit 134, a constant voltage circuit 131, a PMOS transistor 133, and an NMOS transistor 132. The error amplifier circuit 107 is equipped with an amplifier 121, an NMOS transistor 122, and a constant current circuit 123. The amplifier 108 and the resistor 114 configure a ramp wave generating circuit.

A description will next be made about the connections of the DC/DC converter according to the first embodiment.

The amplifier 121 has a non-inversion input terminal connected to a positive electrode of the reference voltage circuit 106, an inversion input terminal connected to a connection point of the resistors 104 and 105, and an output terminal connected to a gate of the NMOS transistor 122. A negative electrode of the reference voltage circuit 106 is connected to the ground terminal 100. The other terminal of the resistor 105 is connected to the ground terminal 100, and the other terminal of the resistor 104 is connected to the output terminal 102. The NMOS transistor 122 has a drain connected to the power supply terminal 101 and a source connected to an inversion input terminal of the PWM comparator 109. The constant current circuit 123 has one terminal connected to the inversion input terminal of the PWM comparator 109 and the other terminal connected to the ground terminal 100. The NMOS transistor 132 has a drain connected to an output terminal of the amplifier 121, a gate connected to a connection point of a drain of the PMOS transistor 133 and the constant current circuit 134, and a source connected to the ground terminal 100. The other terminal of the constant current circuit 134 is connected to the ground terminal 100. The PMOS transistor 133 has a gate connected to a positive electrode of the constant voltage circuit 131 and a source connected to the inversion input terminal of the PWM comparator 109. A negative electrode of the constant voltage circuit 131 is connected to the ground terminal 100. The PWM comparator 109 has a non-inversion input terminal connected to an output terminal of the amplifier 108 and an output terminal connected to a first input of the flip-flop circuit 111. The flip-flop circuit 111 has a second input connected to the output of the oscillation circuit 110, a first output connected to a gate of the PMOS transistor 112, and a second output connected to a gate of the NMOS transistor 113. The PMOS transistor 112 has a drain connected to a drain of the NMOS transistor 113 and a source connected to the power supply terminal 101. A source of the NMOS transistor 113 is connected to the ground terminal 100. The amplifier 108 has a non-inversion input terminal connected to a point at which the drain of the PMOS transistor 112, the drain of the NMOS transistor 113 and the resistor 114 are connected, and an inversion input terminal connected to a connection point of the resistor 114 and the coil 115. The other terminal of the coil 115 is connected to the output terminal 102. The capacitor 116 has one terminal connected to the output terminal 102 and the other terminal connected to the ground terminal 100.

The operation of the DC/DC converter according to the first embodiment will next be described.

When a power supply voltage VDD is inputted to the power supply terminal 101, the DC/DC converter outputs an output voltage Vout from the output terminal 102. The resistors 104 and 105 divide the output voltage Vout and output a divided voltage Vfb. The amplifier 121 compares a reference voltage Vref of the reference voltage circuit 106 inputted to the non-inversion input terminal thereof and the divided voltage Vfb inputted to the inversion input terminal thereof and controls the gate of the NMOS transistor 122 to output an output signal from the output terminal of the error amplifier circuit 107. The amplifier 108 detects a voltage applied across the resistor 114, which is raised by current flowing from the PMOS transistor 112, and outputs a ramp wave from the output terminal thereof. The PWM comparator 109 compares the ramp wave and the output signal of the error amplifier circuit 107 and outputs an output signal to the first input terminal of the flip-flop circuit 111. The flip-flop circuit 111 controls ON/OFF of the PMOS transistor 112 and the NMOS transistor 113 operated as output transistors in such a manner that the output voltage Vout becomes constant, in accordance with the output signal of the PWM comparator 109 and the output signal of the oscillation circuit 110 inputted to the second input terminal thereof.

Since the divided voltage Vfb is lower than the reference voltage Vref when the output voltage Vout is lowered or when the power supply voltage VDD is inputted to the power supply terminal 101 and the output voltage Vout does not reach a constant voltage, the amplifier 121 raises the output voltage thereof to raise the output signal of the error amplifier circuit 107. The threshold value of the PMOS transistor 133 is assumed to be Vtp, the voltage of the constant voltage circuit 131 is assumed to be V1, and the output signal of the error amplifier circuit 107 is assumed to be Verrout. When Verrout rises and exceeds V1+|Vtp|, the PMOS transistor 133 is turned ON to raise a gate voltage of the NMOS transistor 132. When the gate voltage of the NMOS transistor 132 is raised to turn ON the NMOS transistor 132, the output voltage of the amplifier 121 is reduced to lower Verrout. Thus, the output of the error amplifier circuit 107 can be clamped. Since the clamp circuit 130 is operated only when the output of the error amplifier circuit 107 is raised, current consumption can be reduced. Since the number of elements to be used is small, a chip area can be reduced. The voltage adapted to start the clamping of the output of the error amplifier circuit 107 is determined by V1+|Vtp| and can easily be set by adjusting the threshold value of the PMOS transistor 133 and the voltage of the constant voltage circuit 131.

Incidentally, the present embodiment has been described by the system of the current mode DC/DC converter which converts the current flowing through the PMOS transistor 112 into the voltage and detects it and which outputs the ramp wave from the output of the amplifier 108, but is not limited to this system. A voltage mode system using a triangular wave as a ramp wave without using the output of the amplifier 108 may be used.

As described above, the DC/DC converter according to the first embodiment is capable of reducing current consumption by operating the clamp circuit 130 only when the output of the error amplifier circuit 107 is raised. Also, since the number of the elements used in the clamp circuit 130 is small, the chip area can be reduced. Further, the voltage adapted to start the clamping of the output of the error amplifier circuit 107 can easily be set by adjusting the threshold value of the PMOS transistor 133 and the voltage of the constant voltage circuit 131.

Second Embodiment

Figure 2:
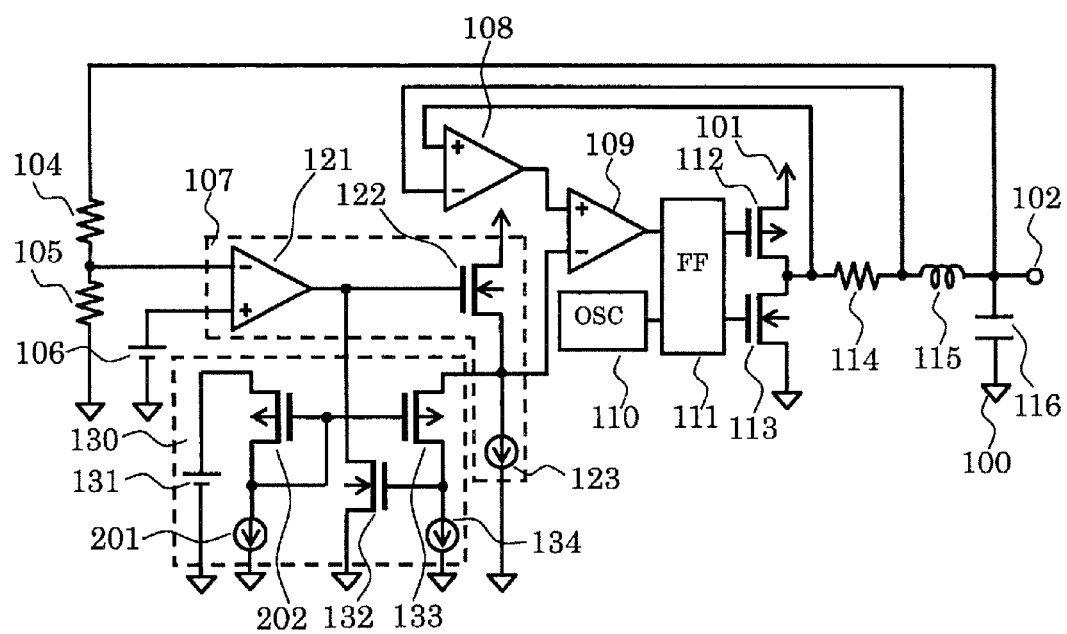
FIG. 2 is a circuit diagram illustrating a configuration of a DC/DC converter according to a second embodiment.
Figure 3:
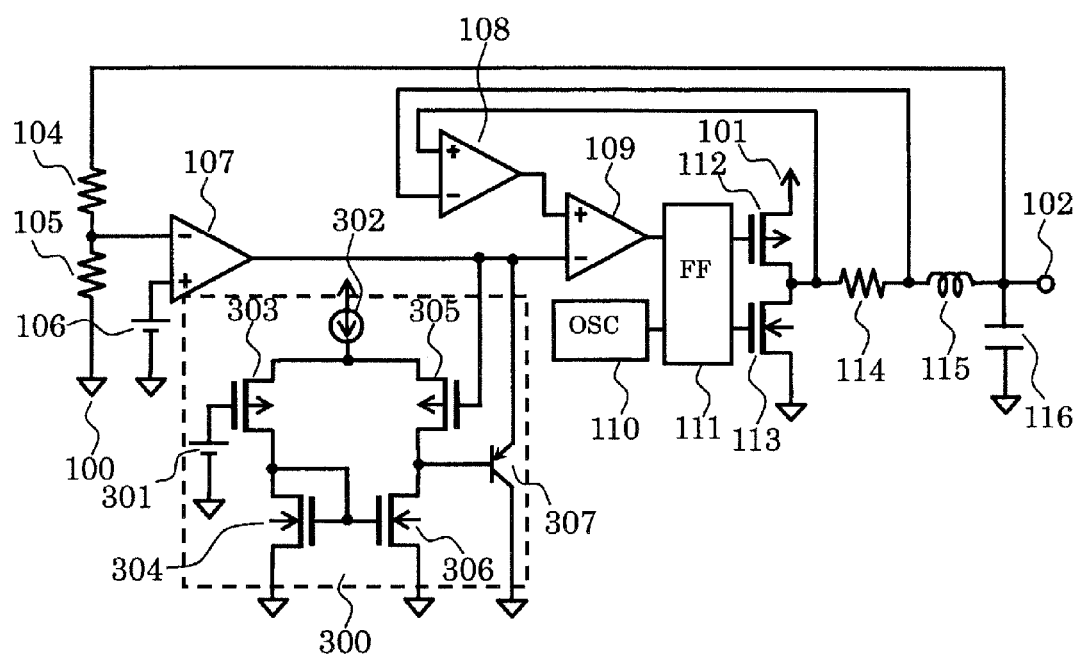
FIG. 3 is a circuit diagram illustrating a configuration of a related art DC/DC converter.

FIG. 2 is a circuit diagram of a DC/DC converter according to a second embodiment. A difference from FIG. 1 resides in that a PMOS transistor 202 and a constant current circuit 201 are added.

A description will be made about the connections of the DC/DC converter. The PMOS transistor 202 has a gate and drain connected to the gate of the PMOS transistor 133 and one terminal of the constant current circuit 201, and a source connected to the positive electrode of the constant voltage circuit 131. The other terminal of the constant current circuit 201 is connected to the ground terminal 100. The negative electrode of the constant voltage circuit 131 is connected to the ground terminal 100. Others are similar to those in FIG. 1.

The operation of the DC/DC converter according to the second embodiment will be described. The operation of inputting the power supply voltage VDD to the power supply terminal 101 and controlling the output voltage Vout of the output terminal 102 to be constant is similar to that in the first embodiment.

Since the divided voltage Vfb is lower than the reference voltage Vref when the output voltage Vout is lowered or when the power supply voltage VDD is inputted to the power supply terminal 101 and the output voltage Vout does not reach a constant voltage, the amplifier 121 raises the output voltage thereof to raise the output signal of the error amplifier circuit 107. Assume that the voltage of the constant voltage circuit 131 is V1 and the output signal of the error amplifier circuit 107 is Verrout. When Verrout rises and exceeds V1, a current flows through the PMOS transistor 133 because the PMOS transistor 202 and the PMOS transistor 133 configure a current mirror. Further, when the gate voltage of the NMOS transistor 132 is raised to turn ON the NMOS transistor 132, the output voltage of the amplifier 121 is reduced so that Verrout is lowered. Thus, the output of the error amplifier circuit 107 can be clamped. Since the clamp circuit 130 is operated only when the output of the error amplifier circuit 107 is raised, current consumption can be reduced. Since the number of elements to be used is small, a chip area can be reduced. Since the voltage adapted to start the clamping of the output of the error amplifier circuit 107 is determined by V1 and can be set highly accurately and easily only by adjusting the voltage of the constant voltage circuit 131 because the influence of the threshold value of the PMOS transistor 133 disappears.

Incidentally, the present embodiment has been described by the system of the current mode DC/DC converter which converts the current flowing through the PMOS transistor 112 into the voltage and detects it, and outputs the ramp wave to the amplifier 108, but is not limited to this system. A voltage mode system using a triangular wave as a ramp wave without using the output of the amplifier 108 may be used.

As described above, the DC/DC converter according to the second embodiment is capable of reducing current consumption by operating the clamp circuit 130 only when the output of the error amplifier circuit 107 is raised. Also, since the number of the elements used in the clamp circuit 130 is small, the chip area can be reduced. Further, the voltage adapted to start the clamping of the output of the error amplifier circuit 107 can be set highly accurately and easily only by setting the voltage value of the constant voltage circuit 131.

What is claimed is:

1. A DC/DC converter comprising:
   an error amplifier circuit including an amplifier which amplifies and outputs a difference between a divided voltage obtained by dividing a voltage outputted from an output transistor and a reference voltage, and a first transistor having a gate connected to an output terminal of the amplifier;
   a clamp circuit which clamps an output voltage of the error amplifier circuit;
   a ramp wave generating circuit which generates a ramp wave; and
   a PWM comparator which compares the output voltage of the error amplifier circuit and the ramp wave,
   said clamp circuit including:
      a constant voltage circuit,
      a constant current circuit,
      a second transistor having a source connected to a source of the first transistor, a gate connected to the constant voltage circuit, and a drain connected to the constant current circuit, and
      a third transistor having a gate connected to the drain of the second transistor and a drain connected to an output of the amplifier.

2. An electronic apparatus comprising the DC/DC converter according to claim 1.

3. A DC/DC converter comprising:
   an error amplifier circuit including an amplifier which amplifies and outputs a difference between a divided voltage obtained by dividing a voltage outputted from an output transistor and a reference voltage, and a first transistor having a gate connected to an output terminal of the amplifier;
   a clamp circuit which clamps an output voltage of the error amplifier circuit;
   a ramp wave generating circuit which generates a ramp wave; and
   a PWM comparator which compares the output voltage of the error amplifier circuit and the ramp wave,
   said clamp circuit including:
      a constant voltage circuit,
      a first constant current circuit,
      a second constant current circuit,
      a second transistor having a source connected to a source of the first transistor and a drain connected to the first constant current circuit,
      a third transistor having a gate connected to the drain of the second transistor and a drain connected to an output of the amplifier, and
      a fourth transistor having a source connected to the constant voltage circuit and a gate and drain connected to the second constant current circuit and a gate of the second transistor.

4. An electronic apparatus comprising the DC/DC converter according to claim 3.

* * * * *